US008689385B2

(12) United States Patent  
Martines et al.

(10) Patent No.: US 8,689,385 B2
(45) Date of Patent: Apr. 8, 2014

(54) TIRE-SHINE SYSTEM AND METHOD (75) Inventors: Jeffrey J. Martines, Birmingham, MI (US); Todd P. Christopher, Trenton, MI (US)

(73) Assignees: Martines Properties, LLC, Birmingham, MI (US); TPC Auto Wash Supply, Inc., Allen Park, MI (US)

( * ) Notice: Subject to any disclaimer, the term of this patent is extended or adjusted under 35 U.S.C. 154(b) by 1466 days.

(21) Appl. No.: 12/018,609

(22) Filed: Jan. 23, 2008

(65) Prior Publication Data

US 2008/0178402 A1 Jul. 31, 2008

Related U.S. Application Data (60) Provisional application No. 60/897,850, filed on Jan. 26, 2007.

(51) Int. Cl.
*B60S 3/06* (2006.01)

(52) U.S. Cl.
USPC .......................................... 15/53.4; 15/53.2

(58) Field of Classification Search
USPC .................. 15/53.2, 53.3, 53.4, 97.3, DIG. 2; 134/123; 118/684, 258, 264, 302, 304, 118/222, 244, 255
See application file for complete search history.

(56) References Cited

U.S. PATENT DOCUMENTS

| 3,346,895 | A | * | 10/1967 | Consolo | 15/53.2 |
| 4,020,518 | A | * | 5/1977 | Harding et al. | 15/53.4 |
| 4,756,044 | A | * | 7/1988 | Clark | 15/182 |
| 4,985,957 | A | * | 1/1991 | Belanger et al. | 15/53.4 |
| 6,260,225 | B1 | * | 7/2001 | Bowman | 15/53.4 |
| 6,461,429 | B1 | | 10/2002 | Gorra | |

* cited by examiner

*Primary Examiner* — Dung Van Nguyen
(74) *Attorney, Agent, or Firm* — Harness, Dickey & Pierce, P.L.C.

(57) ABSTRACT

A tire-shine system includes a housing, at least one manifold supported by the housing, and a brush rotatably supported by the housing. The brush is spaced apart from the at least one manifold and includes a plurality of bristles each including a feather-tipped end. The feather-tipped end of the plurality of bristles selectively receives a first fluid from the at least one manifold.

14 Claims, 9 Drawing Sheets

TIRE-SHINE SYSTEM AND METHOD

CROSS-REFERENCE TO RELATED APPLICATION

This application claims the benefit of U.S. Provisional Application No. 60/897,850, filed on Jan. 26, 2007. The disclosure of the above application is incorporated herein by reference.

FIELD

The present disclosure relates to car wash systems and more particularly to a tire-shine system and method for use in a car wash system.

BACKGROUND

The statements in this section merely provide background information related to the present disclosure and may not constitute prior art.

Conventional car wash systems typically include at least one station dedicated to shining tires of a vehicle. Such conventional systems may include an applicator that selectively receives a cleaning solution and/or shining solution and applies the solution directly to a surface of a vehicle tire. In one configuration, the conventional tire-shine system may include an absorbent foam pad having a shining solution applied at a central portion thereof, which is received and absorbed once applied. Absorbing the shining solution allows the pad to shine the exterior surface of the tire by applying the shining solution to the tire, as the tire passes by the foam pad.

While conventional tire-shine systems adequately apply a shining solution to an exterior surface of a vehicle tire, such conventional systems are costly to operate and do not consistently apply the shining solution to the exterior surface of the vehicle tire. For example, while a tire-shine system including a foam pad adequately absorbs a shining solution and applies the shining solution to an exterior surface of a vehicle tire, the foam pad may become saturated over a period of time and may apply excessive amounts of the shining solution to the vehicle tire when multiple vehicles are consecutively cleaned.

Applying excessive amounts of a shining solution to a foam pad and, thus, to a vehicle tire, may result in the shining solution being applied to surfaces of the vehicle such as a rim and/or body panel and may also cause the shining solution to be applied to moving and/or working components of the tire-shine apparatus. Furthermore, such excess use of the shining solution increases costs associated with operation of the tire-shine system, as shining solution is wasted during periods of high use.

While reducing the amount of shining solution applied to the foam pad may help prevent saturation of the pad during periods of high use, reducing the amount of shining solution applied to the pad often results in an insufficient amount of shining solution applied to vehicle tires especially during periods of infrequent use, as the reduced application of shining solution fails to sufficiently wet the foam pad.

SUMMARY

A tire-shine system includes a housing, at least one manifold supported by the housing, and a brush rotatably supported by the housing. The brush is spaced apart from the at least one manifold and includes a plurality of bristles each including a feather-tipped end. The feather-tipped end of the plurality of bristles selectively receives a first fluid from the at least one manifold.

A tire-shine system includes a housing, at least one manifold supported by the housing, and a brush supported by the housing and being selectively rotatable relative thereto. A controller controls a discharge of a first fluid from the at least one manifold based on a frequency of use of the tire-shine system.

A method includes sensing the presence of a tire, rotating a brush in response to the sensing, and ejecting fluid from a first manifold disposed adjacent to the brush in response to the sensing. The method further includes applying the first fluid to a surface of the tire using a feather-tipped end of the brush.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to the figures, a tire-shine system 10 is provided and includes a housing 12, an actuation system 14, a delivery system 16, and a control system 18. The housing 12 may support at least one of the actuation system 14, delivery system 16, and control system 18. At least one of the actuation system 14 and delivery system 16 may be controlled by the control system 18 to selectively supply water and a cleaning solution and/or shining solution to a tire 20 to clean and/or shine an exterior surface 22 of the tire 20 (FIGS. 11-13). While a cleaning solution and/or shining solution may be applied to the tire 20 by the tire-shine system 10, the solution will be hereinafter referred to as a shining solution.

The tire-shine system 10 includes a pair of halves, each half including the housing 12, the actuation system 14, the delivery system 16, and being in communication with the control system 18. The respective halves of the tire-shine system 10 are positioned on opposite sides of a vehicle such that each half shines two tires of the vehicle. Because the respective halves of the tire-shine system 10 are substantially identical, only one side of the tire-shine system 10 is described and shown in the drawings.

The housing 12 includes a frame 24 supporting at least one of the actuation system 14, delivery system 16, and control system 18. The frame 24 includes a cross-member 26 extending from a pair of posts 28. The cross-member 26 extends generally between each of the posts 28 and includes a mounting surface 30. In one configuration, the mounting surface 30 receives portions of the delivery system 16 to position the delivery system 16 relative to the exterior surface 22 of the tire 20.

In addition to supporting at least one of the actuation system 14, delivery system 16, and control system 18, the housing 12 may also include a bracket 32 having a series of rollers 34. The bracket 32 may be positioned proximate to an inlet of the tire-shine system 10 and at one end of the cross-member 26 to properly position and align the tire 20 with the delivery system 16. The bracket 32 may be positioned at an angle relative to the cross-member 26 such that the rollers 34 are similarly positioned at an angle relative to the cross-member 26. Positioning the bracket 32 and rollers 34 at an angle relative to the cross-member 26 allows the tire 20 to engage the rollers 34 of the bracket 32 to move a portion of the housing 12 relative to the tire 20 to properly position the delivery system 16 relative to the tire 20.

The actuation system 14 may be positioned generally between the posts 28 and may include a first actuation system 36 that selectively retracts the delivery system 16 from a tire 20 and a second actuation system 38 that absorbs forces applied to the housing 12 by an approaching tire 20. The first actuation system 36 may include an air cylinder 40 that cooperates with at least one of the posts 28 and a linkage 42 to selectively move the actuation system 14 into engagement with a tire 20 disposed within the tire-shine system 10. The second actuation system 38 may similarly include a piston/cylinder arrangement 44 such as a shock that absorbs forces exerted on the housing 12 by a tire 20 either approaching the tire-shine system 10 or disposed within the tire-shine system 10.

The first actuation system 36 and second actuation system 38 may cooperate with the linkages 42 to create a four-bar linkage system. As noted above, the first actuation system 36 selectively retracts the actuation system 14 from engagement with an approaching tire 20 or a tire 20 disposed within the tire-shine system 10 while the second actuation system 38 absorbs forces applied to the housing 12 from the tire 20. In either situation, movement of the actuation system 14 and cross-member 26 relative to the posts 28 is permitted by movement of the linkages 42 relative to the posts 28. Such movement of the linkages 42 are respectively controlled by the air cylinder 40 of the first actuation system 36 and the piston/cylinder arrangement 44 of the second actuation system 38. In either situation, movement of the linkages 42 and, thus, the cross-member 26 relative to the posts 28, is controlled by the overall length and pivot locations of the linkages 42 relative to the posts 28 and cross-member 26.

While the respective halves of the tire-shine system 10 are described as being substantially identical, one of the halves is generally fixed relative to the tire 20 such that only miniscule vibration and movement of the tire relative to the housing 12 is absorbed by the second actuation system 38. The other half is disposed on an opposite side of the vehicle from the first half and may include longer linkages 42 than the first half to accommodate varying widths of vehicles. For example, if a wide vehicle is disposed within the tire-shine system 10, the first actuation system 36 only slightly moves the cross-member 26 and, thus, the linkages 42 relative to the housing 12. Conversely, when a relatively narrow vehicle is disposed within the tire-shine system 10, the first actuation system 36 moves the cross-member 26 a greater distance away from the housing 12 to ensure that the delivery system 16 contacts the exterior surface 22 of the tire 20. In so doing, the first actuation system 36 causes the linkages 42 to rotate a greater distance relative to the housing 12 such that the cross-member 26 extends a greater distance away from the housing 12 and engages the exterior surface 22 of the tire 20.

While the first actuation system 36 and second actuation system 38 are described as including an air cylinder 40 and a piston/cylinder arrangement 44, respectively, the first actuation system 36 and second actuation system 38 may include any mechanism that allows for movement of the cross-member 26 relative to the housing 12 and absorbs forces imparted on the tire-shine system 10 by a tire 20 moving through or disposed within the tire-shine system 10 such as, for example, a hydraulically controlled piston-cylinder arrangement or damper.

The delivery system 16 may include a distribution manifold 51, a first manifold 46, a second manifold 48, and a brush 50, which may be supported by the cross-member 26 of the housing 12. The first manifold 46 and second manifold 48 cooperate to respectively supply a first fluid and a second fluid to the brush 50 to allow the brush 50 to supply the first fluid and second fluid to the exterior surface 22 of the tire 20.

The first manifold 46 may be a Delrin® tube in fluid communication with a source of first fluid such as, for example, water, and may include a plurality of apertures 52 spaced apart along a length of the first manifold 46. The apertures 52 may be spaced apart from one another approximately equal to one inch with each aperture 52 comprising a diameter substantially equal to twenty-nine thousandths of one inch (i.e., 0.029 in.). While the spacing between the apertures 52 and the diameter of each aperture 52 is described as being one inch and twenty-nine thousandths of one inch, respectively, the apertures 52 may include any diameter and may be spaced apart any distance that allows the first manifold 46 to supply the brush 50 with a predetermined amount of the first fluid during operation of the tire-shine system 10. The spacing of the apertures 52 and diameter of each aperture 52 is generally dictated by the amount of first fluid to be released from the first manifold 46 during operation and is generally limited so that only a relatively small amount of the first fluid is ejected from the first manifold 46. In other words, the apertures 52 of the first manifold 46 cooperate to supply the brush 50 with a "slow drip" of the first fluid during operation of or subsequent to operation of the brush 50.

The first manifold 46 may be in communication with the distribution manifold 51 such that the distribution manifold 51 supplies the first manifold 46 with first fluid. A pair of distribution manifolds 51 may be employed, whereby a first distribution manifold 51 is associated with a first manifold 46 of a first set of manifolds 55 and a second distribution manifold 51 is associated with a first manifold 46 of a second set of manifolds 57 (FIG. 1).

Figure 1:
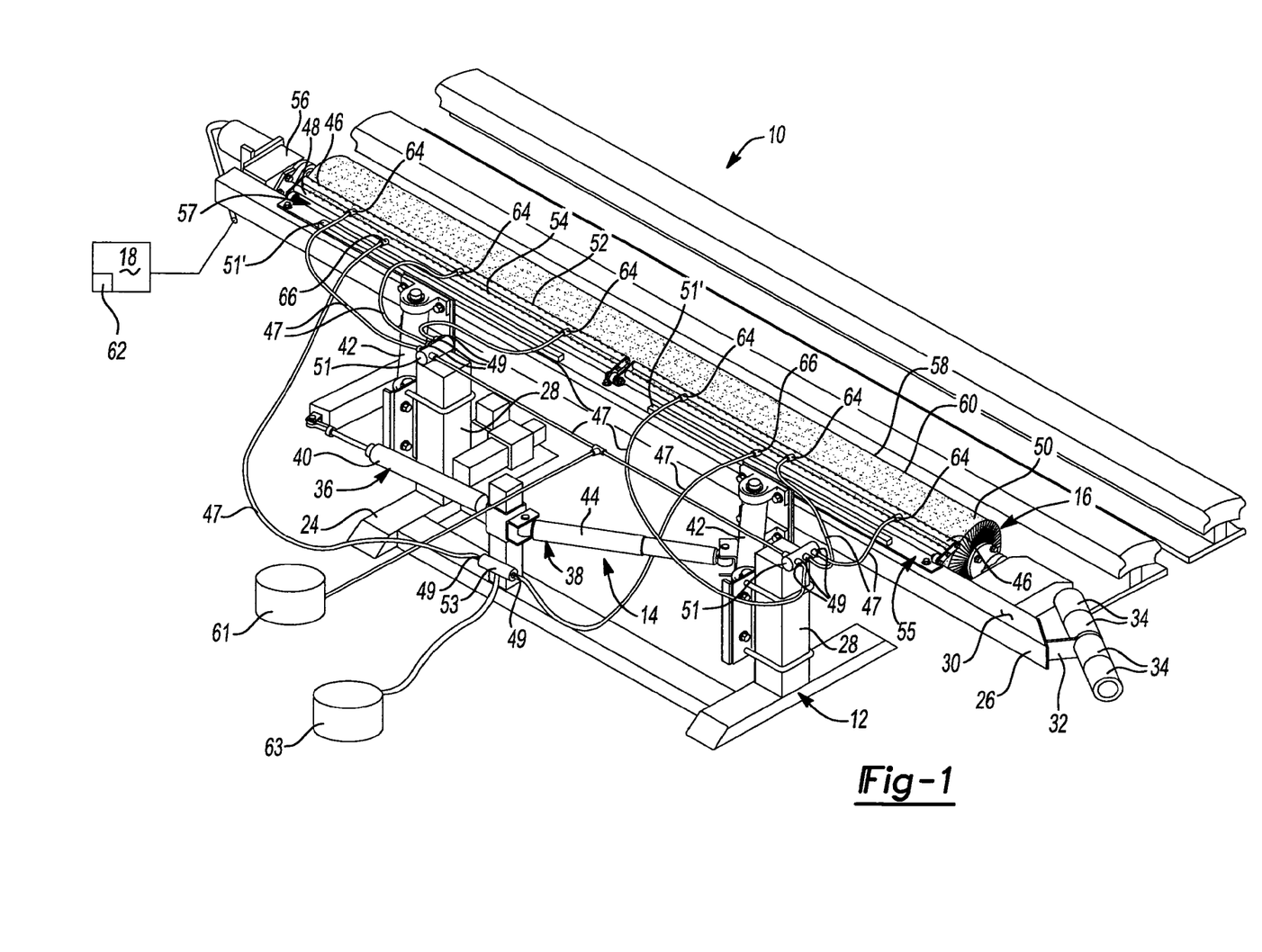
FIG. 1 is a perspective view of a tire-shine system in accordance with the principles of the present teachings.
Figure 2:
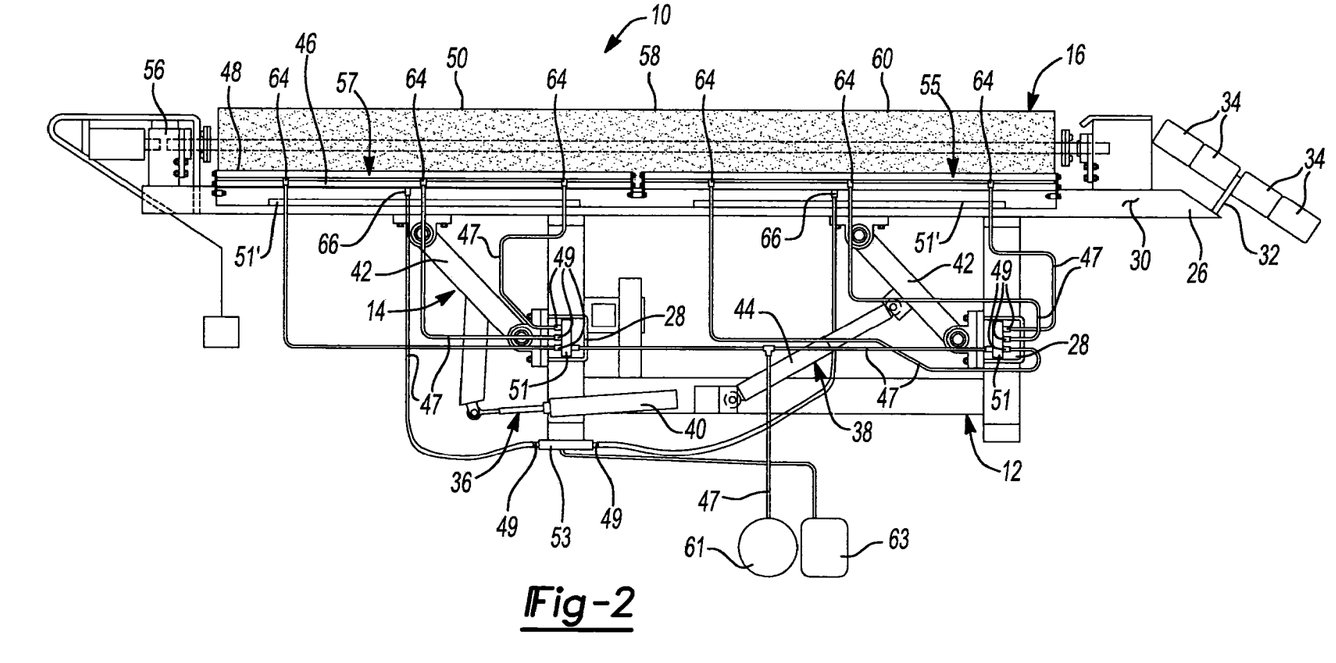
FIG. 2 is a top view of the tire-shine system of FIG. 1.
Figure 3:
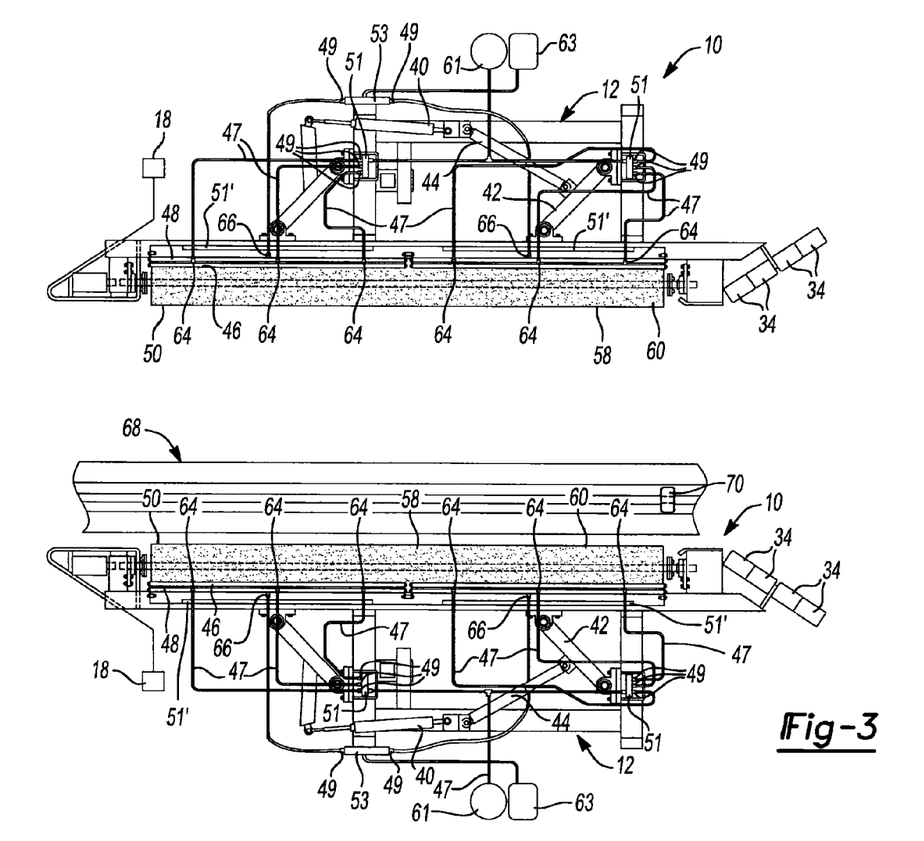
FIG. 3 is a perspective view of the tire-shine system of FIG. 1 incorporated into a car wash system.

While the distribution manifolds 51 may be supported by the posts 28, as shown in FIGS. 1-3, the distribution manifolds 51 may alternatively be supported by the cross-member 26. For example, the distribution manifolds 51 may be positioned on the cross-member 26 generally proximate to each of the second manifolds 48. Such a configuration is shown in FIGS. 1-3, whereby the distribution manifolds 51 are indicated by reference number 51'. Positioning the distribution manifolds 51' in close proximity to the second manifolds 48 reduces the turbulence of the second fluid supplied to the second manifolds 48 due to the proximity of the distribution manifolds 51' to the second manifolds 48. As will be appreciated, the distribution manifolds 51' are only shown in conjunction with distribution manifolds 51 in FIGS. 1-3 to illustrate the alternate location of the distribution manifolds 51' and would be fluidly coupled to a source of the second fluid in a similar fashion as the distribution manifolds 51. In operation, only one pair of the distribution manifolds would actually be employed (i.e., either distribution manifolds 51 or distribution manifolds 51').

The distribution manifolds 51 may respectively be in fluid communication with a remotely located pump 61 that supplies the distribution manifolds 51 with first fluid and may be in fluid communication with the first manifold 46 at any number of locations along a length of the first manifold 46 to distribute the first fluid to the brush 50 along a length of the brush 50. The first manifold 46 may be fluidly coupled to the distribution manifolds 51 at each location by a tube 47 that may include a flow-control valve 49 at one end and a valve 64 at a second end. The valves 49, 64 may be controlled to regulate an amount of first fluid applied to the brush 50 during operation of the tire-shine system 10 and may be located at any point along a length of the tube 47, proximate to the central manifold 51, or proximate to the first manifold 46 at each location along the brush 50.

The valves 64 may include an air-actuated valve and a pin valve (neither shown) that cooperate to selectively supply the first manifolds 46 with first fluid. The air-actuated valve may be disposed generally between the distribution manifolds 51 and the first manifolds 46 and functions to selectively permit and restrict first fluid through the tube 47. The pin valve may be disposed generally between the air-actuated valve and the first manifolds 46 to meter flow through the tubes 47 and into the first manifolds 46.

As described above with respect to the first manifold 46, the second manifold 48 similarly includes a plurality of apertures 54 and may be a Delrin® tube. The apertures 54 of the second manifold 48 may be spaced apart from one another approximately equal to one inch with each of the plurality of apertures 54 including a diameter substantially equal to twenty-nine thousandths of one inch (i.e., 0.029 in.). As with the apertures 52 of the first manifold 46, the apertures 54 of the second manifold 48 may be spaced apart any distance and may include any diameter that allows the second manifold 48 to selectively supply the second fluid at a predetermined rate to the brush 50 during operation of the brush 50. The spacing and size of the apertures 54 along the second manifold 48 is dictated by the desired amount of second fluid to be supplied by the second manifold 48 to the brush 50 during operation of the brush 50. As with the first manifold 46, the second manifold 48 is configured to supply the brush 50 with a "slow drip" of the second fluid to the brush 50 during operation of the brush 50.

The second manifold 48 may be in communication with a central manifold 53 such that the central manifold 53 supplies the second manifold 48 with second fluid. The central manifold 53 may be in fluid communication with a remotely located pump 63 that supplies the distribution manifold 53 with second fluid and may be in fluid communication with the second manifold 48 at any number of locations along a length of the second manifold 48 to distribute the second fluid to the brush 50 along a length of the brush 50. The second manifold 48 may be fluidly coupled to the central manifold 53 at each location by a tube 47 that may include a flow-control valve 49 at a first end and a valve 66 at a second end. The flow-control valve 49 may be controlled to regulate an amount of second fluid applied to the brush 50 during operation of the tire-shine system and may be located at any point along a length of the tube 47, proximate to the central manifold 53, or proximate to the second manifold 48 at each location along the brush 50.

The valves 66 may include an air-actuated valve and a pin valve (neither shown) that cooperate to selectively supply the second manifolds 48 with second fluid. The air-actuated valve may be disposed generally between the distribution manifold 53 and the second manifolds 48 and functions to selectively permit and restrict second fluid through the tube 47. The pin valve may be disposed generally between the air-actuated valve and the second manifolds 48 to meter flow through the tubes 47 and into the second manifolds 48.

As shown in FIG. 1, the first manifold 46 is disposed adjacent to the second manifold 48 and are both supported by the cross-member 26 of the housing 12. In one configuration, the first manifold 46 is fixed to the cross-member 26 such that the first manifold 46 is prevented from moving relative to the cross-member 26. In another configuration, the first manifold 46 is hingedly supported by the cross-member 26 such that the first manifold 46 may be pivoted relative to the cross-member 26 and brush 50.

In one configuration, the second manifold 48 may be fixed relative to the cross-member 26 such that the second manifold 48 is prevented from moving relative to the cross-member 26 and brush 50. In another configuration, the second manifold 48 may be hingedly supported by the cross-member 26 such that the second manifold 48 is selectively movable relative to the cross-member 26 and brush 50.

If the first manifold 46 and/or second manifold 48 are movable relative to the cross-member 26 and brush 50, the first manifold 46 and/or second manifold 48 may be rotated relative to the cross-member 26 to maintain a distance between the first manifold 46 and/or second manifold 48 and the brush 50. For example, the first manifold 46 and second manifold 48 may be moved closer to the brush 50, as the brush 50 wears to maintain a desired distance between the first manifold 46 and/or second manifold 48 and the diminishing outer diameter of the brush 50. In any of the foregoing configurations, the first manifold 46 and second manifold 48 are spaced apart from the brush 50 such that as the brush 50 rotates relative to the housing 12, the brush 50 is not in contact with either the first manifold 46 or the second manifold 48. While the first manifold 46 and second manifold 48 are described as being spaced apart from the brush 50, the first manifold 46 and/or second manifold 48 may be in contact with the brush such that the first fluid from the first manifold 46 and the second fluid from the second manifold 48 are transferred directly from the first manifold 46 and/or second manifold 48, respectively, to the brush 50.

As indicated above and shown in FIG. 1, the tire-shine system 10 may include a first set of manifolds 55 and a second set of manifolds 57, whereby each of the first set of manifolds 55 and the second set of manifolds 57 includes a first manifold 46 and a second manifold 48. The first set of manifolds 55 may be activated when the tire 20 first approaches the tire-shine system 10. Once the tire 20 has been sufficiently moved relative to the housing 12, the second set of manifolds 57 may be activated to further supply the exterior surface 22 of the tire 20 with the first fluid and the second fluid.

Figure 4:
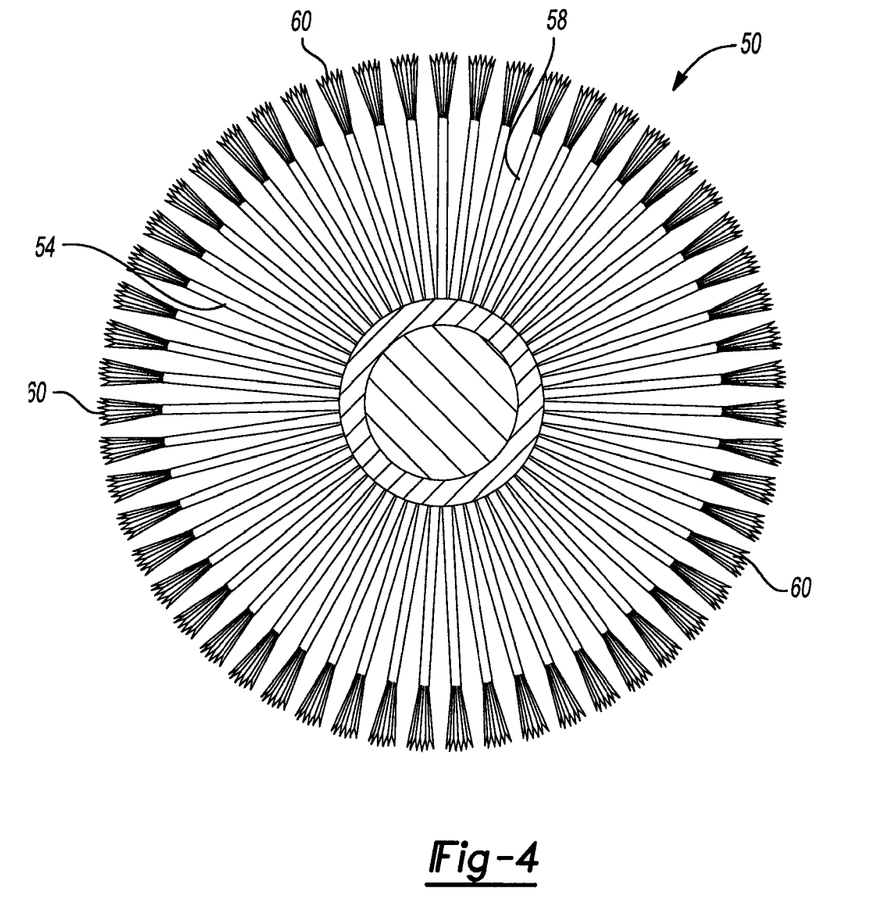
FIG. 4 is a cross-sectional view of a brush of the tire-shine system of FIG. 1.

The brush 50 is rotatably supported by the cross-member 26 and is selectively rotatable relative to the cross-member 26 by an electric motor 56. The brush 50 may include a plurality of bristles 58 each including a feather-tipped end 60 (FIG. 4), which may be formed of a polypropylene material. While a brush 50 having a plurality of bristles 58 formed of a polypropylene material is described, any brush 50 having a feather-tipped end and formed of a material that only permits a minimal amount of absorption may be used. Furthermore, while an electric motor 56 is described, any mechanism that selectively rotates the brush 50 relative to the cross-member 26 such as, for example, a hydraulic system could be implemented.

The control system 18 may be mounted to the housing 12 or, alternatively, may be located remotely from the tire-shine system 10. The control system 18 may include a controller 62 in communication with the first manifold 46, second manifold 48, and electric motor 56. The control system 18 selectively energizes valves 64 associated with the first manifold 46 to dispense the first fluid and selectively actuates valves 66 associated with the second manifold 48 to dispense the second fluid. The control system 18 may alternatively or additionally actuate valves 49 respectively associated with the distribution manifolds 51, 53 to regulate the volume of the first fluid and the volume of the second fluid distributed to the manifolds 46, 48. The controller 62 may also be in communication with the electric motor 56 associated with the brush 50 to selectively energize the electric motor 56 and rotate the brush 50 relative to the cross-member 26. Such rotation of the brush 50 may be coordinated with deposition of the first fluid and second fluid onto the brush 50 and may be properly timed by the controller 62 with an approaching tire 20.

With particular reference to FIGS. 1-5, operation of the tire-shine system 10 will be described in detail. The tire-shine system 10 may be incorporated into a car-wash system 68 (FIG. 3) and may be selectively used on vehicles passing through the car-wash system 68. If the tire-shine system 10 is used, as a tire 20 approaches the housing 12 of the tire-shine system 10, the control system 18 may send a signal to the actuation system 14 to move portions of the housing 12 (i.e., cross-member 26 and links 42) into a position such that the brush 50 engages an exterior surface 22 of the tire 20.

Figure 6:
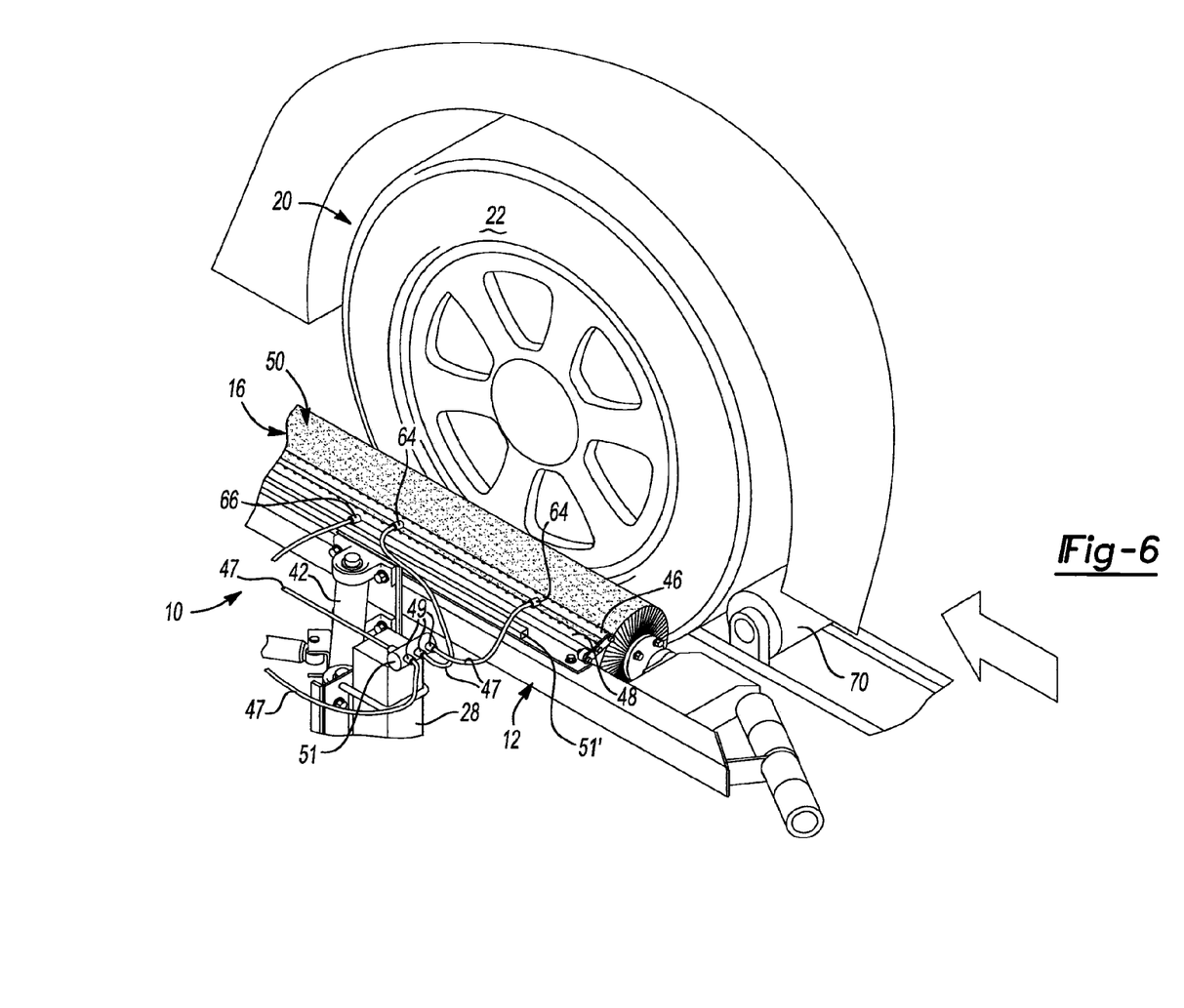
FIG. 6 is a perspective view of the tire-shine system of FIG. 1 showing a vehicle tire disposed in a first portion of the tire-shine system.

The control system 18 may also begin rotation of the brush 50 when the tire 20 approaches the tire-shine system 10 (FIG. 6). As the tire 20 approaches the tire-shine system 10, the control system 18 may open the first manifold 46 (via valve 59 of the central manifold 51 and/or valve 64) to apply a first fluid to the brush 50 and may open the second manifold 48 (via valve 59 of the central manifold 53 and/or valve 66) to apply a second fluid to the second manifold 48. In one configuration, the first fluid is water and the second fluid is a shining solution. While the first fluid is described as being water and the second fluid is described as being a shining solution, the first fluid could alternatively be a shining solution and the second fluid could alternatively be water.

Because the brush 50 is rotating, application of water and the shining solution to the brush 50 causes the water and shining solution to coat the feather-tipped end 60 of each bristle 58 of the brush 50. When the tire 20 enters the tire-shine system 10, the feather-tipped end 60 of the bristles 58 engage the exterior surface 22 of the tire 20 and apply the water and/or shining solution to the exterior surface 22 of the tire 20.

Because the bristles 58 and feather-tipped end 60 of the brush 50 are formed from a polypropylene material, the water and shining solution are not absorbed by the brush 50 and are transferred to the exterior surface 22 of the tire. As such, the first fluid and second fluid are not retained by the brush 50 in significant quantities, which prevents the brush 50 from becoming saturated during use. Continued rotation of the brush 50 relative to the tire 20 allows the feather-tipped end 60 of each bristle 58 to continually contact an exterior surface 22 of the tire 20 to evenly clean and/or shine the entire exterior surface 22 of the tire 20.

Figure 7:
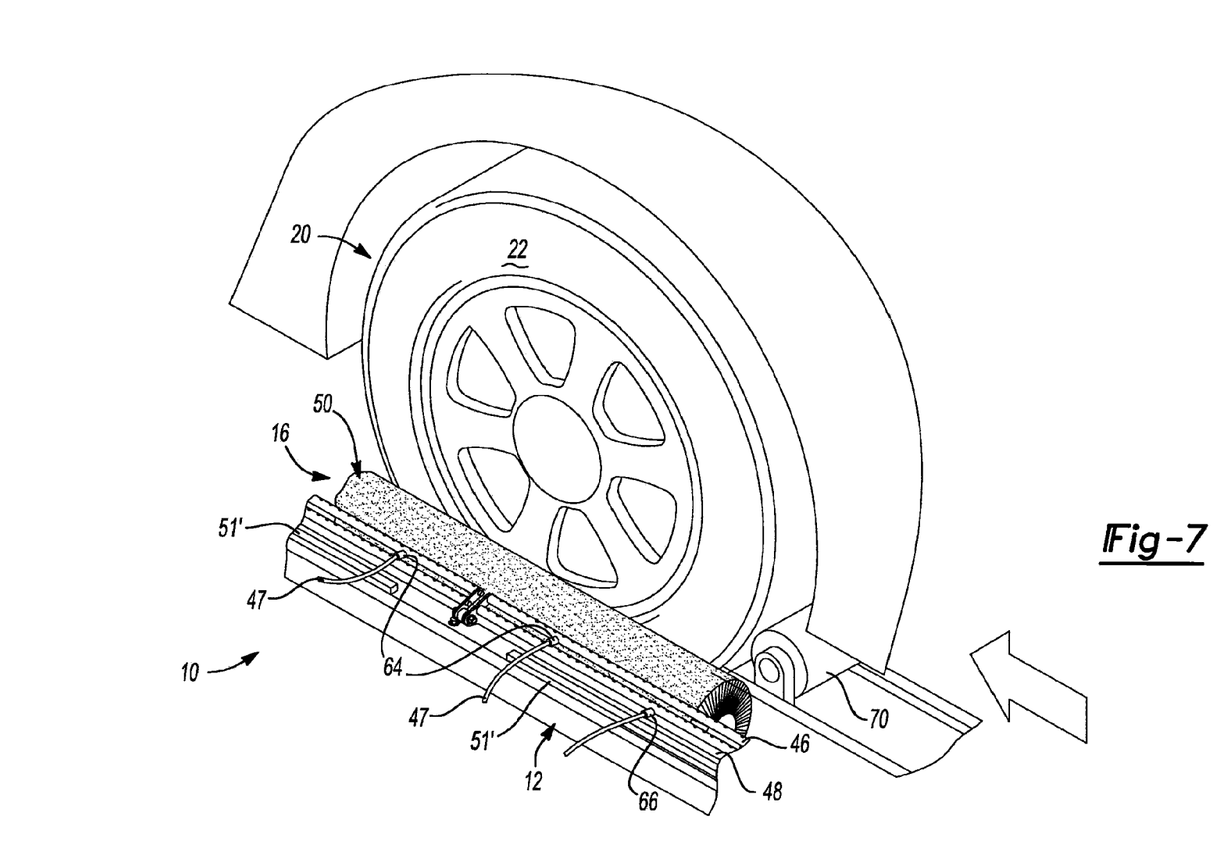
FIG. 7 is a perspective view of the tire-shine system of FIG. 1 showing a vehicle tire disposed in a second portion of the tire-shine system.

If the tire-shine system 10 includes a system having a first set of manifolds 55 and a second set of manifolds 57, the control system 18 may open at least one of the first manifold 46 and second manifold 48 of the second set of manifolds 57 once the tire 20 passes by the first set of manifolds 55 to allow additional water and the shining solution to be transferred to the rotating brush 50. The additional water and/or tire-shine solution may then by applied to the tire 20 via the brush 50 to further shine the exterior surface 22 of the tire 20. If the tire-shine system 10 only includes a single first manifold 46 and a single second manifold 48 each extending generally along a length of the brush 50, water and shining solution may be evenly applied to the brush 50 via the first manifold 46 and second manifold 48 during movement of the tire 20 through the tire-shine system 10 (FIG. 7).

While the first set of manifolds 55 and second set of manifolds 57 are described as applying a first fluid and a second fluid to the brush 50 during operation of the tire-shine system 10, the tire-shine system 10, in contrast, may only apply fluid from the first manifold 46 or from the second manifold 48 of one of the sets of manifolds 55, 57 when a tire 20 is disposed generally within the tire-shine system 10. For example, during periods of frequent use of the tire-shine system 10, residual amounts of the shining solution may remain on the brush 50 between respective vehicles. Therefore, activation of the brush 50 will transfer residual amounts of shining solution from the brush 50 to the exterior surface 22 of the tire 20 without requiring the second manifold 48 of either set of manifolds 55, 57 to apply further shining solution to the brush 50. In such cases, it may be advantageous to apply water to the brush 50 via the first manifold 46 of either or both of the first set of manifolds 55 and the second set of manifolds 57 to activate the shining solution and cause the shining solution to become viscous such that the shining solution and the water are transferred from the brush 50 to the exterior surface 22 of the tire 20.

During periods of infrequent use, application of the shining solution may be supplied from the second manifold 48 of either or both of the first set of manifolds 55 and the second set of manifolds 57 without applying water from the first manifold 46 of either set of manifolds 55, 57. Once the tire 20 exits the tire-shine system 10, the second manifold 48 may be closed and the first manifold 46 may be open to supply water to the brush 50 to remove any excess shining solution from the brush 50. Alternatively, once the tire 20 exits the tire-shine system 10, the first manifold 46 and the second manifold 48 of each set of manifolds 55, 57 may be closed to restrict further application of water and shining solution to the brush 50.

The above concept may be applied to a single vehicle passing through the tire-shine system 10. For example, as a front tire 20 of the vehicle passes through the tire-shine system 10, a rear tire 20 of the vehicle will approach the tire-shine system 10. At this point, the control system 18 will either open the first manifold 46 and second manifold 48 of the first set of manifolds 55 to apply water and shining solution to the brush 50 or will maintain the first manifold 46 and second manifold 48 of the first set of manifolds 55 in the closed position. If the control system 18 opens the first manifold 46 and second manifold 48, water and shining solution will once again be applied to the brush 50 in a manner similar to that described above with respect to the front tire 20. If the control system 18 is configured to maintain the first manifold 46 and second manifold 48 in the closed position, the brush 50 will transfer any remaining water and shining solution from the feather-tipped end 60 of the bristles 58 to the exterior surface 22 of the rear tire 20.

Figure 8:
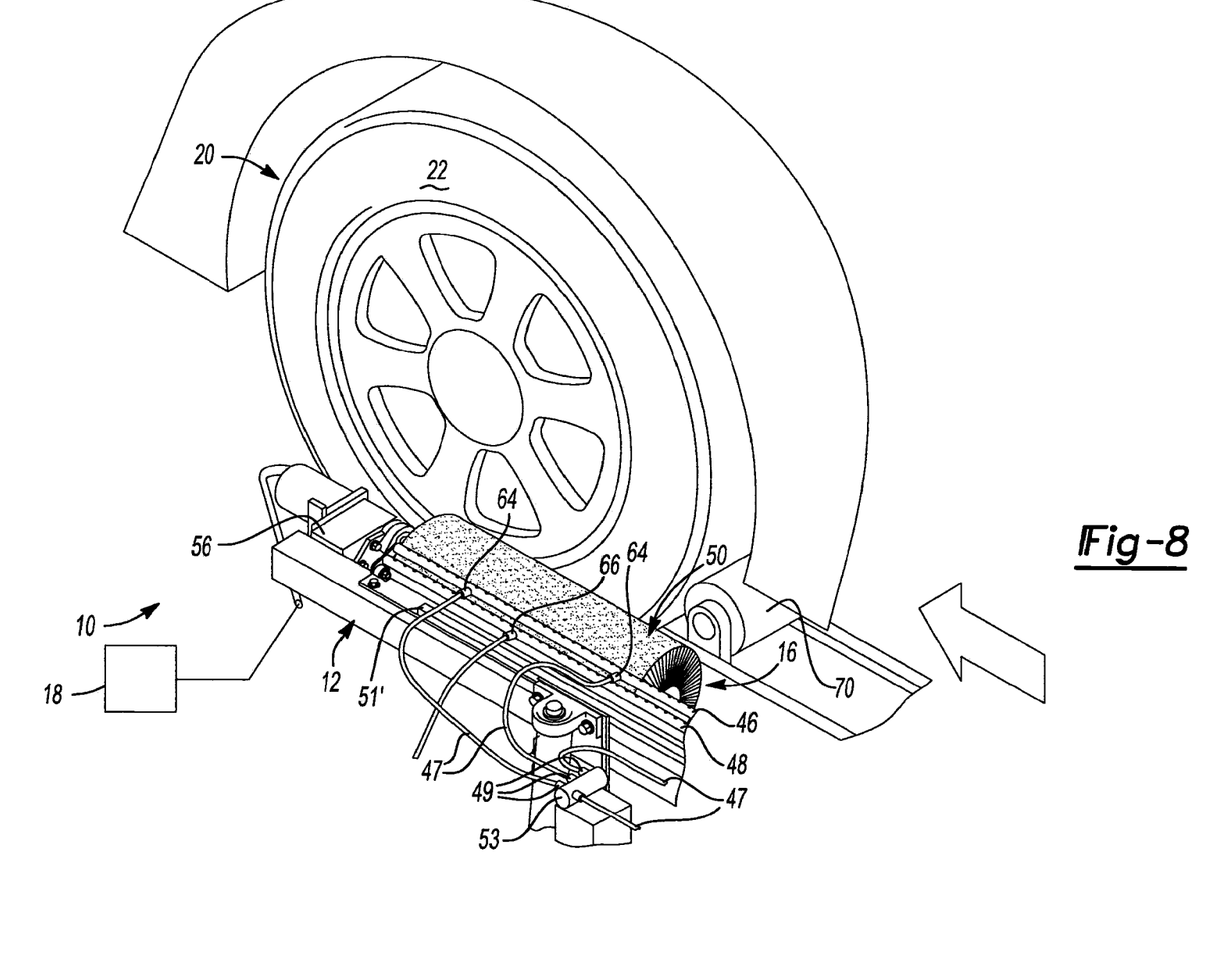
FIG. 8 is a perspective view of the tire-shine system of FIG. 1 showing a vehicle tire disposed in a third portion of the tire-shine system.
Figure 9:
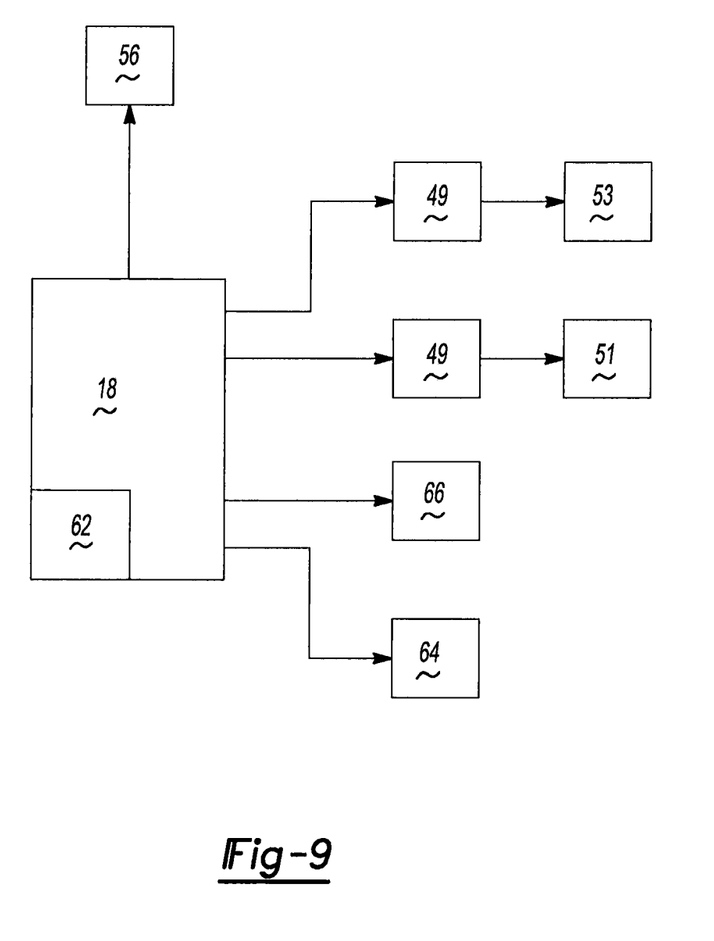
FIG. 9 is a schematic representation of a control system for use with the tire-shine system of FIG. 1.

Once the rear tire 20 has sufficiently passed through the tire-shine system 10 (FIG. 8), the control system 18 will restrict power to the electric motor 56 driving the brush 50 to prevent further rotation of the brush 50 relative to the housing 12. At this point, the first manifold 46 and second manifold 48 of each manifold set 55, 57 may be closed such that water and shining solution are prevented from being transferred from the first manifold 46 and second manifold 48, respectively, to the brush 50.

The control system 18 may be responsive to the number of vehicles passing through the car-wash system 68 and may also be responsive to the number of vehicles receiving an application of shining solution from the tire-shine system 10. For example, if consecutive vehicles passing through the car-wash system 68 elect to receive shining solution from the tire-shine system 10, the control system 18 may only open the first manifold 46 and second manifold 48 to apply water and shining solution to the brush 50 to the tires 20 of the first vehicle passing through the tire-shine system 10. Once the first vehicle has passed through the tire-shine system 10, the water and shining solution remaining on the brush 50 from the first vehicle may then be used to clean the tires 20 of the vehicle following the first vehicle. In other words, after the brush 50 applies the water and shining solution to the front and rear tires 20 of the first vehicle, the control system 18 may then close the first manifold 46 and second manifold 48, preventing further deposition of water and shining solution to the brush 50 when used on subsequent vehicles.

For example, once the first vehicle passes through the tire-shine system 10 and the second vehicle approaches the tire-shine system 10, the control system 18 may once again energize the electric motor 56 of the brush 50 to rotate the brush 50 relative to the housing 12. The tires 20 of the second vehicle are shined using water and shining solution deposited from the first manifold 46 and second manifold 48 during shining of the tires 20 of the first vehicle. By using this procedure, the remaining water and shining solution on the brush 50 can be used to clean an additional set of tires 20 on subsequent vehicles passing through the tire-shine system 10.

The control system 18 may determine whether to open the first manifold 46 and second manifold 48 for subsequent vehicles based on the overall usage of the car-wash system 68 and/or tire-shine system 10 for a particular period of time. For example, if the tire-shine system 10 is repeatedly used for consecutive vehicles, application of water and shining solution to the brush 50 for each vehicle disposed within the car-wash system 68 is unnecessary, as sufficient amounts of water and shining solution will remain on the brush 50 from previous vehicles passing through the car-wash system 68. Such residual water and shining solution may be used on subsequent vehicles passing through the tire-shine system 10 to shine the exterior surface 22 of the front and rear tires 20 of the subsequent vehicles.

If, on the other hand, there are few vehicles passing through the car-wash system 68 and/or few vehicles utilizing the tire-shine system 10, the control system 18 may open the first manifold 46 and second manifold 48 for each vehicle that passes through the tire-shine system 10 to ensure that each tire 20 of each vehicle receives an adequate amount of water and shining solution.

By controlling the tire-shine system 10 in the manner described above, the control system 18 may reduce buildup of shining solution on the brush 50 and related system components by applying an amount of shining solution based on the number of vehicles through the car-wash system 68 and/or the number of vehicles that use the tire-shine system 10. By limiting the amount of shining solution to only that which is needed, the control system 18 is able to reduce the overall consumption of shining solution and, therefore, reduce operating costs associated with the car-wash system 68 and tire-shine system 10.

The control system 18 may also regulate an amount of shining solution deposited on the brush 50 by the second manifold 48 by controlling the individual flow-control valves 49 and/or 66. For example, the control system 18 may allow a flow-control valve 49, 66 disposed proximate to an opening of the tire-shine system 10 to deposit more shining solution on the brush 50 when compared to other flow-control valves 49, 66 located downstream of the opening. The increased application of shining solution to the brush 50 at the opening of the tire-shine system 10 allows the tire 20 to transfer any excess shining solution back to the brush 50 at locations downstream of the system opening, as the tire passes through the tire-shine system 10. Because the excess shining solution is transferred by the tire 20 to the brush 50, as the tire 20 passes through the tire-shine system 10, less shining solution is required to be deposited on the brush 50 downstream of the system opening. This control strategy may be applied to both the front and rear tires 20 of the vehicle, as the vehicle travels through the tire-shine system 10.

In addition to regulating an amount of shining solution applied to the brush 50 along a length of the brush 50, the control system 18 may also regulate an amount of shining solution applied to front and rear tires 20. For example, the control system 18 may apply less shining solution to rear tires 20 of a vehicle than to front tires, as residual shining solution remaining on the brush 50 from shining the front tires 20 may be used to shine the rear tires 20. In one configuration, the control system 18 may apply fifty-percent less shining solution to the rear tires 20 than is applied to the front tires 20.

Figure 5:
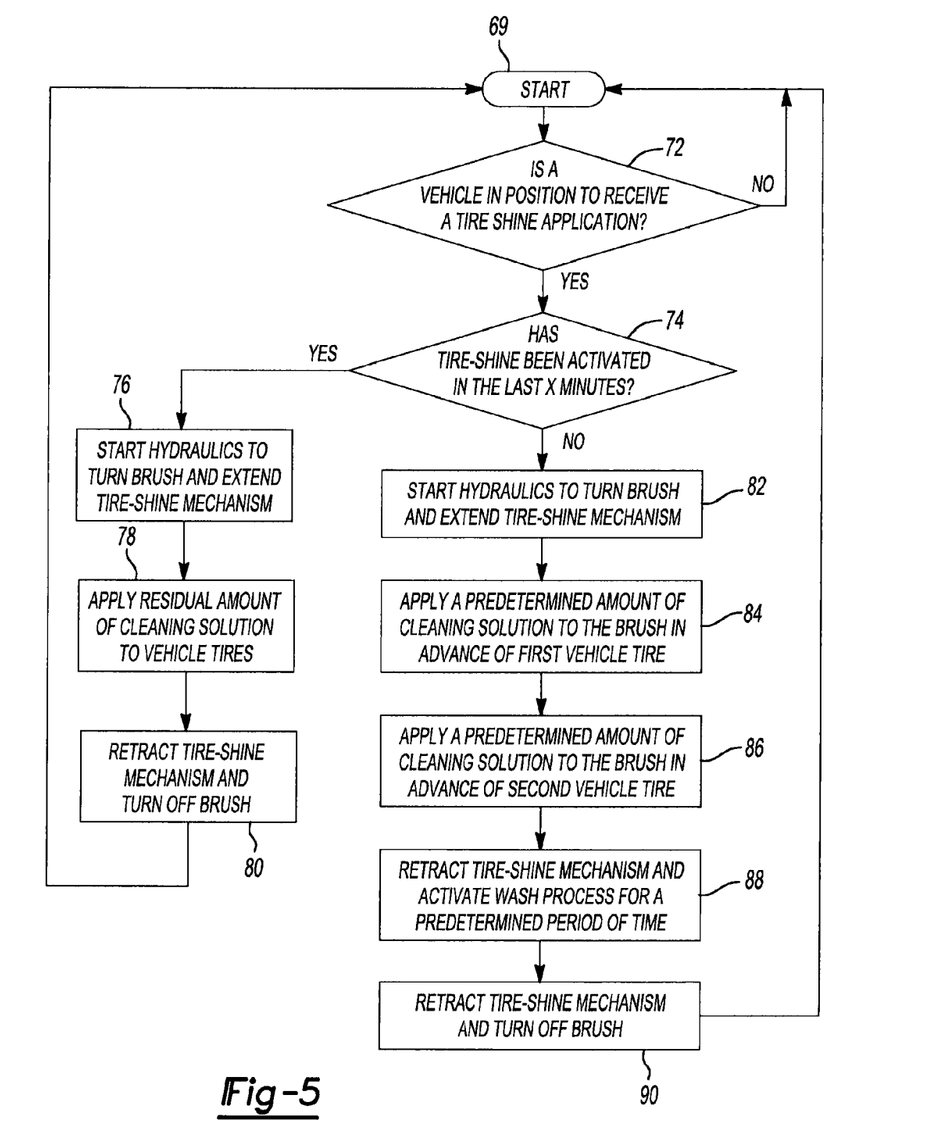
FIG. 5 is a flow chart detailing operation of a control system associated with the tire-shine system of FIG. 1.

With reference to FIG. 5, a flow chart for a control scheme of the tire-shine system 10 is provided. When the car-wash system 68 is started at 69, the control system 18 energizes a drive system 70 (FIG. 3) to move a vehicle through the car-wash system 68 and tire-shine system 10. When the vehicle approaches the tire-shine system 10, the control system 18 determines if the vehicle is in a position to receive a tire shine application at 72. If the control system 18 determines that the vehicle is not in a position to receive an application of shining solution and/or water from the tire-shine system 10, the control system 18 reverts back to the start block at 69. If the control system 18 determines that the vehicle is in a position to receive a tire-shine application from the tire-shine system 10, the control system 18 then determines if the tire-shine system 10 has been activated within the last "X" minutes at 74, which may fall within a range of five to ten minutes in one configuration. While the control system 18 determines if the tire-shine system 10 has been activated in the last "X" minutes, any period of time may be programmed into the control system 18 for determining whether the tire-shine system 10 has been recently activated at step 74.

If the control system 18 determines that the tire-shine system 10 has been activated within the last "X" minutes at 74, the control system 18 initiates rotation of the brush 50 by energizing the electric motor 56 and the second actuation system 38 to extend the tire-shine system 10 at 76. Once the brush 50 is activated and moved into a position engaging the exterior surface 22 of the tire 20, the brush 50 applies residual amounts of shining solution and/or water to the exterior surface 22 of the vehicle tires 20 at 78. Following application of the residual shining solution and/or water, the brush 50 is stopped and the brush 50 is retracted at 80.

If the control system 18 determines that the tire-shine system 10 has not been activated within the last "X" minutes, the control system 18 energizes the electric motor 56 to initiate rotation of the brush 50 and extends the brush 50 by activating the second actuation system 38 at 82. Once the brush 50 is activated and extended, the control system 18 applies a predetermined amount of shining solution and/or water to the brush 50 in advance of the first vehicle tire 20 entering the tire-shine system 10 at 84. The control system 18 then applies a predetermined amount of shining solution and/or water to the brush 50 in advance of the second vehicle tire 20 at 86.

Upon application of the shining solution and/or water to the exterior surface 22 of the tire 20, the control system 18 retracts the brush 50 and activates the first manifold 46 to deliver water to the brush 50 to wash any remaining shining solution from the brush 50 at 88. Once the brush 50 is sufficiently cleaned, the control system 18 closes the first manifold 46 and stops rotation of the brush 50 at 90.

What is claimed is:

1. A tire-shine system comprising:
a housing defining an entrance and an exit;
a brush rotatably supported by said housing and including a plurality of bristles;
at least one manifold supported by said housing and including a plurality of apertures operable to apply a first fluid to said brush by allowing said first fluid to exit said at least one manifold at said plurality of apertures and drip onto said plurality of bristles, said at least one manifold selectively movable toward said brush into a plurality of use positions in response to said brush experiencing wear to maintain a desired distance between said at least one manifold and said brush during use; and
a controller operable to apply a first amount of said first fluid to said brush proximate to said entrance and operable to apply a second amount of said first fluid to said brush proximate to said exit, said first amount of fluid being greater than said second amount of fluid.

2. The tire-shine system of claim 1, wherein said plurality of bristles of said brush are formed of a polypropylene material.

3. The tire-shine system of claim 1, wherein each of said plurality of bristles includes a feather-tipped end.

4. The tire-shine system of claim 1, wherein said plurality of apertures each include a diameter substantially equal to twenty-nine thousandths of an inch and are spaced apart from one another by approximately one inch.

5. The tire-shine system of claim 1, wherein said at least one manifold is hingedly supported by and selectively movable relative to said housing.

6. The tire-shine system of claim 1, wherein said controller controls discharge of said first fluid from said at least one manifold based on a frequency of tires or vehicles passing through the tire-shine system.

7. The tire-shine system of claim 1, wherein said at least one manifold includes a first manifold delivering said first fluid and a second manifold delivering a second fluid.

8. A tire-shine system for a vehicle having front tires and rear tires, the tire-shine system comprising:
a housing receiving the front tires and the rear tires;
a brush supported by said housing, selectively rotatable relative thereto, and in selective engagement with the front tires and the rear tires;
at least one manifold disposed at least partially above said brush and operable to supply said brush with a first fluid by allowing said first fluid to drip from said at least one manifold onto said brush, said at least one manifold selectively movable toward said brush into a plurality of use positions in response to said brush experiencing wear to maintain a desired distance between said at least one manifold and said brush during use; and
a controller operable to apply a first amount of said first fluid to the front tires and operable to apply a second amount of said first fluid to the rear tires by controlling discharge of said first fluid from said at least one manifold, said first amount being greater than said second amount.

9. The tire-shine system of claim 8, wherein said controller controls discharge of said first fluid from said at least one manifold based on a frequency of tires or vehicles passing through the tire-shine system.

10. The tire-shine system of claim 8, wherein said at least one manifold is hingedly supported by said housing such that said at least one manifold is selectively movable relative to said housing.

11. The tire-shine system of claim 8, wherein said brush includes a plurality of bristles each including a feather-tipped end.

12. The tire-shine system of claim 8, wherein said brush is formed of a polypropylene material.

13. The tire-shine system of claim 8, wherein said brush is formed from a non-absorbent material such that said first fluid is not absorbed by said brush.

14. The tire-shine system of claim 8, wherein said at least one manifold includes a first manifold delivering said first fluid and a second manifold delivering a second fluid.

* * * * *